Patented Oct. 24, 1944

2,361,055

UNITED STATES PATENT OFFICE 2,361,055

ACRYLATE POLYMERS AND METHOD OF PRODUCING SAME

Maxwell A. Pollack, Akron, Ohio, assignor to Pittsburgh Plate Glass Company, Allegheny County, Pa., a corporation of Pennsylvania No Drawing. Application August 23, 1938, Serial No. 226,310

8 Claims. (Cl. 260—83)

This invention relates to the preparation of fusible polymeric unsaturated esters of acrylic and the alpha substituted acrylic acids and to the method of rendering such polymers infusible. Prior to this invention, it has been recognized that certain methacrylic acid esters of unsaturated alcohols could be polymerized to form infusible, insoluble products. While polymers so produced have many desirable characteristics, they are difficult to handle because of their lack of reactivity. Since they can not be molded readily, the uses of these materials have been generally considered to be limited to those applications wherein cast polymerization processes are permissible.

In accordance with my invention, I have been able to polymerize monomeric unsaturated alcohol esters of the acrylic and alpha substituted acrylic acids, such as allyl methacrylate, methallyl chloracrylate, etc., under such conditions that a fusible polymer which is soluble in organic solvents may be secured. This product may then be molded to a convenient shape, if desired, and subsequently rendered infusible by further polymerization in suitable manner, for example, by application of heat, light or other sources of energy with or without catalysts.

I have found that soluble, fusible polymers of the unsaturated esters of the acrylic and alpha substituted acrylic acids, such as allyl methacrylate, allyl chloracrylate, methallyl chloracrylate, methallyl methacrylate, etc., may be produced by polymerizing the monomeric ester under proper conditions as hereinafter set forth. The fusible products may be produced, for example, by polymerization of the esters in solvents which are capable of dissolving the fusible polymer, and interrupting polymerization before the infusible insoluble polymer is formed. Other methods whereby polymerization of the acrylate radical occurs without substantial interpolymerization of the unsaturated ester radical may also be resorted to. I have found that when the unsaturated alcohol esters of acrylic or alpha substituted acrylic acids, such as allyl methacrylate, are polymerized in these solvents, for example, acetone, dioxane, chloroform, etc., a soluble polymer is formed initially, but as polymerization proceeds, the insoluble polymer is produced and the solution is converted to a non-reversible gel. By interrupting polymerization in a suitable manner before the gel is formed, a soluble, fusible polymer may be secured. This fusible polymer is found to be soluble in a majority of the solvents in which the polymers of the saturated alcohol esters of acrylic acid or substituted acrylic acids are normally soluble.

While the invention is especially applicable to the allyl or methallyl esters of the acrylic or alpha substituted acrylic acids, I have found that desirable products may be secured from numerous other unsaturated alcohol esters thereof, such as the crotyl, cyclohexenyl, oleyl, etc., esters of these acids.

In general, it has been found that the solvents, in which polymers of the saturated alcohol esters of acrylic acid or alpha substituted acrylic acid, such as methyl methacrylate, methyl chloracrylate, etc., are soluble, should be used for this purpose. Thus, such solvents as acetone, dioxane, chloroform, toluene, benzene, carbon tetrachloride, methyl cellosolve acetate, phenyl cellosolve, dichloroethyl ether, xylene, tetralin, dibutyl phthalate, etc., are found to be suitable. In addition, the saturated acrylic or alpha substituted acrylic esters such as monomeric methyl, ethyl, propyl, etc., methacrylate or chloracrylate, or other polymerizable materials, for example, "vinyl" compounds, such as styrene, vinyl chloride, vinyl acetate, etc., may be added to the above solution before polymerization in order to form copolymers. Since such materials particularly vinyl acetate, vinyl chloride, styrene, etc., dissolve substantial amounts of the fusible polymers, they may be used themselves as solvents.

In each case, the polymerization should be interrupted before the infusible product is produced. Since the polymer apparently becomes infusible whenever the acrylate groups are interpolymerized with the unsaturated alcoholic group, polymerization should be interrupted before this phenomenon occurs. This may be accomplished by stopping polymerization before gel formation is observed. In accordance with one illustrative method of interrupting polymerization, the polymer may be separated from the solvent by convenient methods, for example, by the addition of a compound in which acrylate polymers are normally insoluble, such as methyl or ethyl alcohol, petroleum ether, water, ethylene glycol, etc. This process permits the isolation of the fusible polymer of the unsaturated alcohol ester of acrylic and alpha-substituted acrylic acids in a substantially pure state.

Polymerization may also be halted by lowering the temperature of the reaction mixture to a suitable degree, for example, to room temperature or below. It has been found that although polymerization proceeds fairly rapidly at temperatures of 35–40° C., or above, the reaction rate increasing with increase of temperature, it proceeds at such a slow rate that it may be practically discontinued at lower temperature. This is especially true when polymerization is carried out in solution.

In accordance with another effective method of interrupting polymerization, inhibitors, such as pyrogallol, hydroquinone, aniline, phenylene diamine, sulphur, thiophenol, organic or inorganic salts or complexes of the reduced forms of metals such as copper, manganese, cobalt, nickel, etc., dipentene, etc., may be added to the polymer during polymerization or before polymerization has been initiated. In this manner, solutions of the fusible polymer may be secured. These solutions may be treated to remove the solvent by slow evaporation, treatment with a nonsolvent, or other suitable method and fusible cast thermoplastic polymers which may be machined, cut, bent or otherwise worked into desirable forms whereby obtained. After final shaping, the products may be completely hardened and rendered infusible by suitable methods hereinafter more fully set forth.

It has been found that the yield of fusible polymer appears to be dependent to a great extent upon the concentration of the monomer in the solution undergoing polymerization. Thus, when very concentrated solutions containing a large quantity, for example, in excess of 40–50 percent, of the monomeric allyl or methallyl methacrylate, are subjected to conditions of polymerization, the amount of fusible polymer which may be secured prior to gel formation is very low, often not in excess of 5 percent by weight of the theoretical yield. Conversely, when solutions containing somewhat lower concentrations of monomer, for example, up to 30 percent by weight, yields of the fusible polymer upward of 95 percent of the theoretical may be secured. Accordingly, it is preferred to deal with solutions having a monomer concentration below 40 percent by weight.

The yield of fusible polymer appears to be increased by treating the solutions at increased temperatures and increased catalyst concentrations. Thus, substantially greater yields may be secured by polymerizing allyl methacrylate solutions at 100° C. or above than may be secured at 60° C. Catalyst concentrations up to 5 percent or more may be used in some cases. In general, conditions favoring the formation of lower molecular weight polymers appear to result in increased yields of fusible products.

The following examples illustrate the preparation of these fusible polymers.

Example I

One part by weight of allyl methacrylate was heated with 0.07 parts by weight of benzoyl peroxide and 5.6 parts by weight of acetone under reflux for 4 hours. The resulting solution was carefully poured, with stirring, into 100 parts of methanol. A white precipitate which was fusible and soluble in acetone was formed. This material began to soften when heated to 95–110° C., and was a soft plastic mass at 120–140° C. However, prolonged heating caused loss of this plasticity, with the formation, first of an elastic, and then a hard, brittle product.

Example II 55 parts by weight of allyl chloracrylate were heated with 3 parts by weight of benzoyl peroxide and 350 parts by weight of acetone at a temperature of 60° C. for 4 hours. At this time, 300 parts of methanol were added to produce turbidity, and the resulting mixture was poured slowly, with stirring, into 1600 parts of methanol. The white voluminous precipitate thus formed was filtered and dried, and was soluble in acetone and chloroform and softened at 110–125° C. It was a highly plastic gum at 140–150° C. hardening with further heating.

The fusible polymers so produced have many characteristics which are similar to those of the polymers formed from the saturated acrylic acid esters. They are soluble in such organic solvents as acetone, dioxane, chloroform, ethyl cellosolve acetate, triacetin, phenyl cellosolve, etc., and soften upon heating. The allyl methacrylate polymer prepared in Example I softens and becomes readily plastic at a temperature of 95–110° C. The allyl chloracrylate prepared in Example II softens at a temperature of 110–125° C. The exact softening points of the products are dependent to a great degree upon the temperature, catalyst concentration and monomer concentration of the solution undergoing polymerization. In general, it is found that the chloracrylic esters soften at a temperature somewhat higher than the corresponding acrylic and methacrylic esters and at normal temperatures are somewhat harder and more dense. All of these products appear to be easily molded into convenient shapes.

In accordance with my invention, I have found that upon subjection of these polymers to heating at temperatures somewhat above the softening point thereof, for a sufficient period of time, they are converted into infusible, insoluble, transparent, hard and wear-resistant products. This conversion appears to occur in the absence of catalysts. It may be assisted, however, by the incorporation of usual polymerization catalysts, such as oxygen, ozone, air, peroxides, such as hydrogen peroxide, benzoyl peroxide or acetyl peroxide, basic or acidic catalysts, light, etc. By use of catalysts, it is found that the conversion of these products to the infusible state may be secured at lower temperatures. The application of super-atmospheric pressure has been found to assist the transformation to the insoluble and infusible stage.

The properties of the products so produced are dependent to a degree upon the conditions under which they were rendered infusible. Thus, extremely hard somewhat brittle products may be prepared by effecting the treatment at relatively high temperatures or under high pressures. On the other hand, somewhat stronger, less brittle materials may be secured when the treatment is carried under moderate pressures and temperatures sufficiently low to permit a slow conversion of the fusible polymer into its infusible stage through a period in which it is substantially completely molten.

By operation, in accordance with the present invention, it is thus possible to form a molded article from the fusible polymer such as the fusible polymeric allyl or methallyl methacrylate or chloracrylate previously referred to, and thereafter to render the molded product insoluble and infusible by heat. In this manner, I am able to prepare transparent, hard, infusible molded products which have many of the desirable properties of the conventionally known thermoplastic resins.

By proper regulation of the pressure and temperature, the fusible polymer may be extruded under such conditions that it becomes infusible as it leaves the extrusion die.

A large number of inert substances may be incorporated with the fusible polymer before subjecting to molding conditions. Suitable for such purposes are: fillers, such as wood-flour, mica, cotton flock, etc., plasticizers, such as dibutyl phthalate, dicyclohexyl phthalate, triacetin, tricresyl phosphate, natural and synthetic resins, pigments, including titanium dioxide, carbon black, chromic oxide, lead chromate, etc., and organic dye-stuffs, such as methylene blue, methyl orange, etc.

If desired, similar products may be made from suitable copolymers of the olefinic esters of the acrylic or alpha substituted acrylic acids with the saturated esters of these acids such as the methyl and ethyl esters thereof. In some cases, it is found that infusible products which are stronger and less brittle than the single polymer may be produced in this manner. This is particularly true when the allyl or other olefinic ester is polymerized with a saturated alcohol ester, such as the methyl or ethyl ester of methacrylic or chloracrylic acid.

The polymers which I have prepared are capable of numerous uses, such as in lacquers, or other coating compositions, molded articles, safety glass, etc. Where the composition is used for coating, it may be applied in solution or in solid form, either alone or in combination with natural or synthetic drying oils or resins and the like, the solvent removed and the coated article baked to render the surface infusible. In this manner, it is possible to surface other polymers which are less resistant to the action of solvents or of heat. When a coating of the fusible polymer of allyl methacrylate is deposited upon polymerized methyl methacrylate or similar polymer and the solvent removed, a coherent surface thereof is formed. Upon heating the coated article to suitable temperatures, this surface may be made transparent, hard and infusible.

Being of the thermosetting type, these resins do not exhibit the phenomenon of "cold flow," and are thus especially desirable for such uses as airplane windshields, where the pressure differences have been found to bow thermoplastic glass substitutes, particularly at the higher altitudes. Coating may also be applied to metal, glass, wood, synthetic resins, etc., surfaces by extrusion of the heated fusible polymer directly on the suitably-prepared surface. In similar manner, the surface may be heated and the polymer applied in powdered form, whereupon fusion occurs first to give a smooth, homogeneous film which may then be heat-hardened.

These resins are also suitable for many uses in the field of laminated products. For example, products of great strength, elasticity and adherence may be secured by converting fusible allyl or methallyl methacrylate, chloracrylate, etc., into the infusible state in the presence of a substantial amount of a compatible softening agent. Satisfactory non-shatterable glass sheets may be obtained by heating a combination of superposed sheets where the thermoplastic allyl methacrylate polymer and a softening agent such as dibutyl phthalate are used as the adhesive layer.

It has been found that these products are applicable for impregnation purposes. Thus, leather, paper, wood or other comparatively porous substances may be steeped in a solution of the fusible polymer of methallyl methacrylate, for example, and then heated alone, under pressure, or in the presence of catalysts to convert the absorbed polymer to the insoluble, infusible form. Greatly improved products, particularly in regard to strength, water-proofing, and electrical properties are obtained.

The following examples illustrate the conversion of the fusible resin into the infusible form:

Example III

Two parts of fusible allyl methacrylate polymer, prepared in accordance with Example I, was rendered molten by heating under slight pressure at 140° C. in a mold, and then converted to a clear, hard, infusible, and insoluble sheet by heating at 170° C. under a pressure of 5000 lbs. per sq. in. for one-half hour.

Example IV

Two parts of fusible allyl chloracrylate polymer, prepared as in Example II, was fused at 140–150° C., and then molded as in Example III at 160–170° C. under pressure of 2000 lbs. per sq. in. for one hour. The product obtained was hard, clear, and unaffected by solvents or heat to the point of pyrolytic decomposition.

Example V

Two parts of the thermoplastic form of allyl acrylate polymer was fused at 130–140° C., and then heated in a mold at 160° C. under a pressure of 3000 lbs. per sq. in. for one hour. The resulting product was hard, clear, and unaffected by solvents or heat to the point of pyrolytic decomposition.

Example VI

One part by weight of the fusible methallyl methacrylate polymer was dissolved in 10 parts of acetone and the solution applied to the surface of a cast sheet of polymerized methyl methacrylate. Upon evaporation of the solvent, a white opaque surface was obtained. This product was heated at 140–150° C. for one hour and a material having a comparatively soft interior and a surface which was transparent, hard, and resistant to the action of heat and solvents was produced.

The process may also be extended to the production of mixed polymers or copolymers. Thus, the fusible polymer prepared in accordance with my invention may be mixed with other polymers such as polymers of methyl methacrylate, methyl chloracrylate, vinyl acetate, vinyl chloride, styrene, etc., and the mixture subjected to conditions of polymerization.

Although the present invention has been described with reference to the specific details of certain embodiments thereof, it is not intended that such details shall be regarded as limitations upon the scope of the invention except insofar as included in the accompanying claims.

I claim:

1. A method of polymerizing allyl methacrylate which comprises polymerizing said ester, interrupting the polymerization after substantial polymerization has occurred but before the polymer is converted into an infusible gel, substantially completely separating residual monomer from the resulting polymer, subjecting the polymer to a temperature and pressure sufficient to ensure existance of the polymer in fused state and continuing polymerization of the fused polymer for a time sufficient to convert the polymer into a substantially insoluble and infusible state.

2. A method of polymerizing allyl chloracrylate which comprises polymerizing said ester, interrupting the polymerization after substantial polymerization has occurred but before the polymer is converted into an infusible gel, substantially completely separating residual monomer from the resulting polymer, subjecting the polymer to a temperature and pressure sufficient to ensure existance of the polymer in fused state and continuing polymerization of the fused polymer for a time sufficient to convert the polymer into a substantially insoluble and infusible state.

3. A method of preparing an insoluble, infusible resin from allyl acrylate, which comprises preliminarily polymerizing allyl acrylate, interrupting polymerization after it has occurred to a substantial degree, but before the polymer is converted into an infusible gel, substantially completely separating residual monomer from the resulting polymer, fusing the polymer by application of heat and pressure and continuing polymerization until the polymer is converted into substantially infusible and insoluble state.

4. A method of preparing an infusible, insoluble resin from the ester of (a) acrylic acid and (b) a monohydric monounsaturated alcohol containing 3 to 4 carbon atoms which comprises preliminarily polymerizing said ester, interrupting the polymerization after it has occurred to a substantial degree, but before the polymer is converted into an infusible gel, substantially completely separating residual monomer from the resulting polymer, fusing the polymer by application of heat and pressure and continuing polymerization until the polymer is converted into substantially infusible and insoluble state.

5. A method of preparing an infusible, insoluble resin which comprises preliminarily polymerizing an ester of (a) methacrylic acid and (b) a monohydric monounsaturated alcohol containing 3 to 4 carbon atoms interrupting the polymerization after it has occurred to a substantial degree, but before the polymer is converted into an infusible gel, substantially completely separating residual monomer from the resulting polymer, fusing the polymer under heat and pressure and continuing polymerization until the polymer is converted into substantially infusible and insoluble state.

6. A method of preparing an infusible, insoluble resin, which comprises preliminarily polymerizing an ester of (a) chloracrylic acid and (b) a monohydric, monounsaturated alcohol containing 3 to 4 carbon atoms, interrupting polymerization after it has occurred to a substantial degree, but before the polymer is converted into an infusible gel, substantially completely separating residual monomer from the resulting polymer, fusing the polymer by application of heat and pressure and continuing polymerization until the polymer is converted into substantially infusible and insoluble state.

7. A method of polymerizing an ester of (a) a monohydric alcohol having an unsaturated linkage in an aliphatic chain of 3 to 4 carbon atoms and (b) an acid of the group consisting of acrylic acid, methacrylic acid, and chloroacrylic acid which comprises polymerizing said ester, interrupting the polymerization after substantial polymerization has occurred but before the polymer is converted into an infusible gel, substantially completely separating residual monomer from the resulting polymer, subjecting the polymer to a temperature and pressure sufficient to ensure existance of the polymer in fused state and continuing polymerization of the fused polymer for a time sufficient to convert the polymer into a substantially insoluble and infusible state.

8. The method of claim 1 in which the polymerization is conducted in the presence of a solvent for monomer and polymer.

MAXWELL A. POLLACK.